(12) United States Patent
Bartlett et al.

(10) Patent No.: US 9,940,211 B2
(45) Date of Patent: Apr. 10, 2018

(54) RESOURCE SYSTEM MANAGEMENT

(71) Applicant: International Business Machines Corporation, Armonk, NY (US)

(72) Inventors: Eric J. Bartlett, Salisbury (GB); Matthew J. Fairhurst, Winchester (GB); Nicholas M. O'Rourke, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 13/915,923

(22) Filed: Jun. 12, 2013

(65) Prior Publication Data
US 2014/0053017 A1 Feb. 20, 2014

(30) Foreign Application Priority Data
Aug. 14, 2012 (GB) .................... 1214498.6

(51) Int. Cl.
G06F 11/20 (2006.01)
G06F 11/07 (2006.01)
G06F 11/10 (2006.01)

(52) U.S. Cl.
CPC ...... *G06F 11/2089* (2013.01); *G06F 11/0727* (2013.01); *G06F 11/0793* (2013.01);
(Continued)

(58) Field of Classification Search
CPC ............ G06F 11/0727; G06F 11/0793; G06F 11/1076; G06F 11/108; G06F 11/1084;
(Continued)

(56) References Cited

U.S. PATENT DOCUMENTS 6,854,071 B2   2/2005 King et al.
7,222,259 B2   5/2007 Tanaka et al.
(Continued)

FOREIGN PATENT DOCUMENTS

CN    101887387 A    11/2010

OTHER PUBLICATIONS

Search Report under Section 17, United Kingdom Intellectual Property Office, Application No. GB1214498.6, dated Dec. 7, 2012.
(Continued)

*Primary Examiner* — Michael Maskulinski
(74) *Attorney, Agent, or Firm* — Samuel A. Waldbaum

(57) ABSTRACT

A resource system comprises a plurality of resource elements and a resource controller connected to the resource elements and operating the resource elements according to a predefined set of operational goals. A method of operating the resource system comprises the steps of identifying error recovery procedures that could be executed by the resource elements, categorizing each identified error recovery procedure in relation to the predefined set of operational goals, detecting that an error recovery procedure is to be performed on a specific resource element, deploying one or more actions in relation to the resource elements according to the categorization of the detected error recovery procedure, and performing the detected error recovery procedure on the specific resource element.

6 Claims, 6 Drawing Sheets

(52) U.S. Cl.
CPC ........ *G06F 11/108* (2013.01); *G06F 11/1092* (2013.01); *G06F 11/2094* (2013.01)

(58) Field of Classification Search
CPC ............. G06F 11/1088; G06F 11/1092; G06F 11/2089; G06F 11/2092; G06F 11/2094
See application file for complete search history.

(56) References Cited

U.S. PATENT DOCUMENTS

| | | | |
|---|---|---|---|
| 7,263,582 B2 | 8/2007 | Vasudevan et al. | |
| 7,428,602 B2 | 9/2008 | Vageline et al. | |
| 7,523,347 B2 | 4/2009 | Kanayama | |
| 8,433,947 B2* | 4/2013 | Noguchi | G06F 11/16 714/6.2 |
| 2003/0163757 A1 | 8/2003 | Kang et al. | |
| 2004/0068501 A1* | 4/2004 | McGoveran | G06F 11/1474 |
| 2005/0081086 A1 | 4/2005 | Williams | |
| 2006/0004548 A1* | 1/2006 | Santos | G06F 11/008 703/1 |
| 2006/0010343 A1 | 1/2006 | Tanaka et al. | |
| 2006/0075283 A1 | 4/2006 | Hartung et al. | |
| 2006/0107091 A1* | 5/2006 | Hafner | G06F 11/1076 714/5.1 |
| 2006/0161805 A1 | 7/2006 | Tseng et al. | |
| 2006/0253674 A1* | 11/2006 | Zohar | G06F 11/0793 711/165 |
| 2008/0010507 A1 | 1/2008 | Vingralek | |
| 2008/0209253 A1* | 8/2008 | Sheppard | G06F 11/1096 714/1 |
| 2009/0249111 A1 | 10/2009 | Manoj et al. | |
| 2009/0282297 A1* | 11/2009 | Anna | G06F 11/0727 714/48 |
| 2009/0287956 A1 | 11/2009 | Flynn et al. | |
| 2009/0293051 A1 | 11/2009 | Krywaniuk | |
| 2010/0031082 A1* | 2/2010 | Olster | G06F 11/1092 714/6.32 |
| 2010/0235677 A1* | 9/2010 | Wylie | G06F 11/1044 714/5.1 |
| 2012/0089867 A1* | 4/2012 | Bartlett | G06F 11/2094 714/6.22 |
| 2014/0201566 A1* | 7/2014 | Best | G06F 11/2094 714/6.11 |

OTHER PUBLICATIONS

Bartlett, et al. Application No. GB1214498.6, filed with the United Kingdom Intellectual Property Office (UK IPO) on Aug. 14, 2012.
IBM et al., "Enhanced RAID-5 Error Recovery in Response to Drive Hard Read Errors". An IP.com Prior Art Database Technical Disclosure. IP.com No. IPCOM000123202D. IP.com Electronic Publication: Apr. 4, 2005.
Park, Chong-Won and Park, Jin-Won. "A multiple disk failure recovery scheme in RAID systems". Journal of Systems Architecture 50 (2004) pp. 169-174. Copyright 2003 Elsevier B.V.

* cited by examiner

RESOURCE SYSTEM MANAGEMENT

FIELD OF THE INVENTION

This invention relates to a method of operating a resource system comprising a plurality of resource elements and a resource controller. In a preferred embodiment, the invention provides drive error recovery process management to maintain or restore array configuration.

BACKGROUND OF THE INVENTION

In storage systems, the Redundant Arrays of Independent Disks (RAID) protocol is used to provide a mixture of performance and drive redundancy characteristics in a storage system that comprises an array of disk drives. RAID geometries can have redundancy to enable a failed or inaccessible array member drive to be removed from the array whilst maintaining the data integrity and access to the array.

An array member drive can report failures that indicate a destructive maintenance procedure is required in an attempt to recover the drives health, for example, a drive format unit. In these cases all data is lost and the drive can be unavailable for many minutes or hours. Alternatively, known drive behaviours can be used to predict such a destructive procedure will be needed in the near future, for example, by using drive predictive failure analysis. A drive can also report conditions which indicate a significant non-destructive maintenance procedure is required, such as an SSD table rebuild. These procedures can have negative impacts on the drive and the raid array from a performance and availability perspective and also take significant periods of time from minutes to hours.

When a drive requires these types of significant Error Recovery Procedures (ERPs), such as format unit or a table rebuild, existing product solutions require the user to instigate the drive ERPs through system maintenance procedures. Other potential examples include that a user might run a maintenance procedure to remove the drive from the array and then running a performance benchmark against it (to diagnose performance problems), a user might be able to force SSD drives to perform free-space collection to optimize future performance, or a user might be able to instigate an in depth drive self-test that works best offline, for example, to check drive track alignments. By their nature, the existing solutions are limited because they rely on user intervention.

SUMMARY

Embodiments of the present invention disclose a method, computer program product, and system for operating a resource system. A plurality of resource elements are connected to a resource controller and operates the resource elements according to a predefined set of operational goals. Error recovery procedures are identified that could be executed by the resource elements, each identified error recovery procedure is categorized in relation to the predefined set of operational goals, an error recovery procedure is detected that is to be performed on a specific resource element, one or more actions in relation to the resource elements are deployed according to the categorization of the detected error recovery procedure, and the detected error recovery procedure is performed on the specific resource element.

BRIEF DESCRIPTION OF THE SEVERAL VIEWS OF THE DRAWINGS

Preferred embodiments of the present invention will now be described, by way of example only, with reference to the following drawings, in which.

DETAILED DESCRIPTION

Owing to the invention, it is possible to provide an autonomic solution that will instigate resource error recovery procedures without the need for user intervention. For resource systems that force drive replacement, the invention has the benefit of extending the deployment life of drives. The invention and its extensions are concerned with how the resource ERP is scheduled and managed to preserve system operational goals, such as redundancy and/or performance, where possible, and to prevent or manage the risk of any impacts on system reliability.

In the context of implementation of the invention in a RAID drive array, the main advantages of the invention over existing maintenance procedures include extending the lifecycle of drives before manual intervention is required for maintenance, reacting quickly to required drive maintenance to restore drives to service as soon as possible, which improves the availability of the system in the same manner as hot spares versus manual spares, integration of drive maintenance procedures into RAID redundancy/availability/performance algorithms to minimise impact of drive maintenance on resource system, which reduces system impact compared to existing manual procedures, and system restoration, which minimises the exposure of RAID arrays to drives that have undergone ERPs that are perceived to be less reliable.

Figure 1:
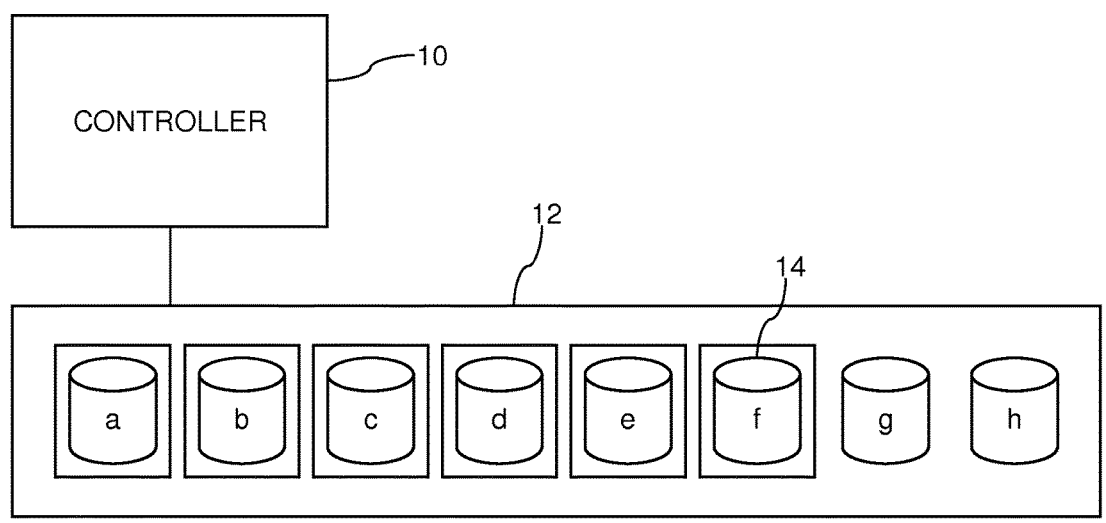
FIG. 1 is a schematic diagram of a RAID array.

FIG. 1 illustrates a resource system with a resource controller 10 that is connected to a RAID array 12 which comprises individual resource elements 14, being drives that make up the RAID array. The resource controller 10 is operating the resource elements 14 according to a predefined set of operational goals, which is essentially the RAID level being implemented by the resource system. The operational goals of the RAID level will define how the drives 14 are operated with regard to such issues as data redundancy, availability, and performance. In the RAID array 12 of FIG. 1, drives "a" to "f" are member drives and the system has spare drives "g" and "h" that are appropriate spares for all array members. The resource controller 10 can be a dedicated piece of hardware or can be a general purpose computing device that is controlled by a computer program product on a computer readable medium that is for operating the resource system.

Error recovery procedures (ERPs) are used on individual drives when the behaviour of a drive suggests that it is not functioning at its full capability. The system takes into account the system drive and RAID configuration/status and uses an algorithm for making a decision about when to instigate the drive ERPs. The algorithm splits into three distinct parts: part A—Drive ERP Needed Identification; part B—RAID Controlled Drive ERP Scheduling; and part C—RAID Controlled Drive ERP Application and Recovery.

Part A—Drive ERP Needed Identification describes a system for the identification of the need for drive maintenance procedures. Part B—RAID Controlled Drive ERP Scheduling describes a configuration model and algorithm that ensures the scheduled drive ERP meet with RAID array membership concerns for availability/redundancy/performance. In part B, the drive ERP scheduling is coordinated with the RAID algorithms in an automated fashion. Part C—RAID Controlled Drive ERP Application and Recovery describes how the application of the drive ERP is optimised for the present RAID array state with respect to concerns for RAID availability/redundancy/performance.

For part A—Drive ERP Needed Identification, there is firstly defined a drive ERP model that takes the following perspectives into account (which can be drive product specific): whether there is data loss if drive data is lost or cannot be trusted after the ERP has completed; whether the drive will be offline during ERP; whether the drive will have significantly degraded performance during ERP; the expected duration of the ERP; and the repeatability, which is number of times the ERP can be performed before user maintenance is required. The resource controller 10 is able to identify the above ERP attributes from the system state based on, for example, a drive status indicating that an ERP is needed, a system performance measurement has indicated that ERP is needed, and/or a drive status indicating that drive ERP has completed. The drive status might take the form of SCSI protocol check conditions or other similar communication mechanisms, depending upon the implementation specifics of the resources 14 deployed in the system. An algorithm to define if a drive ERP is needed may be as follows.

Part A—Drive ERP Needed Identification

Step 1: is drive already undergoing ERP? If yes then exit; if no then go to next step. This step intentionally limits active instigated drive ERPs to one at a time to reduce impact on system spare drive coverage Step 2: is drive ERP needed? If yes then go to next step; if no then exit. Whether a drive ERP is needed can be derived from the drive status indicating that an ERP is needed or a system performance measurement has indicated that ERP is needed.

Step 3: is drive ERP supported by drive type? If yes then go to next step; if no then exit. I.e., does the configured/static drive ERP support include ERP for this drive type?

Step 4: has drive ERP application already been attempted? I.e., has this drive ERP been considered in part B (below) for the present system configuration/status, which represents optimisation of logic to prevent re-evaluation.

After the above algorithm has been processed for each drive in the system the output is a list of drives that have been identified as needing drive ERPs. This list of drives is the input for part B to attempt a RAID controlled drive ERP scheduling.

Part B—RAID Controlled Drive ERP Scheduling

This part of the algorithm ensures the scheduled drive ERP meets with RAID array membership concerns for availability, redundancy and performance. Firstly, there is defined a set of system goals that can be configured by the user or set statically. Below is an example of a set of operational goals that can be used in the algorithm but could be extended:

Goal 1—RAID data integrity goal: always maintain RAID array data integrity (always yes); do not perform data loss ERP on a drive that is a RAID array's last path to data.

Goal 2—RAID redundancy goal: always maintain redundancy (yes or no); if yes then only process a drive ERP for an array member if there is a spare drive it can be exchanged to first.

Goal 3—RAID availability goal: always maintain availability (yes or no); if yes then only allow a drive ERP if it does not take an array offline.

Goal 4—RAID performance goal: always maintain performance (yes or no); if yes then only process a drive ERP that causes the array member drive to exhibit degraded performance if there is a spare drive that the array member can be exchanged to first.

Goal 5—RAID reliability goal: always maintain reliability (yes or no); if yes then only allow drive ERP once per drive, favour drives that have not undergone ERPs for spare drive selection These operational goals can be modelled across the system or on a per array basis. The operational goals are used to categorize the various ERPs so that the RAID array (or whatever resource system is being used) can take the necessary actions needed to maintain the operational goals while carrying out the ERP correctly. The resource controller 10 will take one or more specific actions in relation to the resource elements, according to the categorization of the ERP being used, before (and possibly after) the ERP is actually performed. For example, an action might be to swap the data stored by a specific resource element to a different resource element.

An example of the RAID controlled drive ERP scheduling algorithm using the above system goals configuration model may be as follows.

Step 1: does performing the drive ERP meet system redundancy goals? If yes then go to next step, if no then exit. The answer will be yes, for example, if an offline non-redundant array member drive needs an ERP that is not a data loss ERP; an online non-redundant array member drive needs an ERP that is not a data loss/offline ERP or is an offline ERP and availability goal is false; an online redundant array member drive needs an ERP that is not a data loss/offline ERP or spare available or redundancy goal false; or a drive needs an ERP and is not an array member.

Step 2: does performing the drive ERP meet system reliability goals? If yes then go to next step; if no then exit. The answer will be yes, for example, if the drive ERP has not been performed before, or the drive ERP has been performed before and reliability goal is false.

Step 3: does performing the drive ERP meet system performance goals? If yes go to next step; if no then exit. The answer will be yes, for example, if the drive ERP does not impact drive performance, or the drive ERP does impact drive performance and a spare drive is available, or performance goal is false.

Step 4: is drive ERP the highest priority possible? If yes then go to next step; if no then exit.

Step 5: search all drives needing supported ERPs (i.e., those that get to this step) to find highest priority based on:
drive is intended to be array member, drive is array member, drive is offline;
drive is intended to be array member, drive is array member;
drive is intended to be array member, goal array not redundant;
drive is intended to be array member, drive offline;
drive is intended to be array member;
drive is spare, drive offline;
drive is spare;
drive offline.

This example priority order gives precedence to restoring and maintaining the existing array configuration availability and redundancy. Other schemes could be chosen (see below for more detail). After the above algorithm has run, a single drive ERP has been selected to run (if a drive ERP is needed and meets the goals).

Part C—RAID Controlled Drive ERP Application and Recovery

The input is a drive that needs an ERP, and performing the drive ERP will meet with the system goals for RAID availability, redundancy, and performance. The algorithm defines an approach for optimising how the drive ERP is performed and how the system recovers from the drive ERP:

Step 1: for drive ERPs that cause data loss and are array members: if spare available, start array member drive exchange to spare, then go to step 4; else go to step 5.

Step 2: for drive ERPs that cause offlines or performance degradation and are array members: if drive ERP duration short, keep the array member drive in place and initiate a "component in doubt" RAID array ERP to temporarily reduce the array redundancy by disabling the RAID array member, and record what writes are needed for submission to the drive after it has recovered (and is no longer in doubt) to regain the array redundancy until the drive ERP completes, then go to step 5; else, if spare available, start array member exchange to spare, then go to step 4; else go to step 5.

Step 3: for all other drive ERPs (where the drive is not an array member), go to step 6.

Step 4: wait for exchange to complete, then go to step 5.

Step 5: wait for array to be in consistent state, then go to step 6. This ensures array data consistency during the drive ERP start period, and typically means waiting for all outstanding RAID array IO to complete (so that there is no IO in flight).

Step 6: start drive ERP and wait for completion (after completion go to step 7). Drive specific procedure is instigated and allowed to complete to restore the drive back to full health.

Step 7: perform system restoration by replaying any recorded "component in doubt" writes to the drive to regain array redundancy, and such that any needed sparing or array balancing attempts to only allow single offline/data corruption ERP drive to be added per mirror pair/parity redundancy. The array membership goal is that if all these drives failed, then the array would stay online and includes drives that have already done data loss/offline ERPs that affect drive availability. These drives are perceived to have lower reliability, as they are more likely to need the ERP again. This step is intended to limit the potential impacts of the drive ERP being needed again.

This algorithm describes a specific implementation of the resource system management that ensure the ERPs are scheduled in an autonomic manner, without any impact on the predefined set of operational goals (here, the RAID goals). The seven-step algorithm ensures that the drive ERPs are handled so that necessary actions are taken to ensure that the operation of any specific ERP does not impact on the RAID goals that define how the resource array should be operated. In relation to a RAID array, the operational goals relate to such characteristics as redundancy and performance, but the nature of the operational goals will be specific to the implementation of the resource system.

Various extension ideas are possible for the above seven-step algorithm. For concurrency, the algorithm could allow as many ERPs as possible that do not impact spare protection. For prioritisation, if multiple drives need ERP, do the most important first (i.e., do data loss ERPs first, then offline ERPs, then performance ERPs) and/or if multiple drives need ERP, do the quickest first, based on duration estimate. For reliability control, apply a user configurable hard limit for how many times a drive ERP occurs for a drive before drive replacement is required, and/or apply a user configurable time based limit (e.g., X times in Y seconds) for how many times a drive ERP occurs for a drive before drive replacement is required. For RAID control integration, extend the sparing policy to incorporate drive ERP history to balance exposure of arrays to ERP impact, considering ERP type, counts, frequency, and/or duration.

Figure 2:
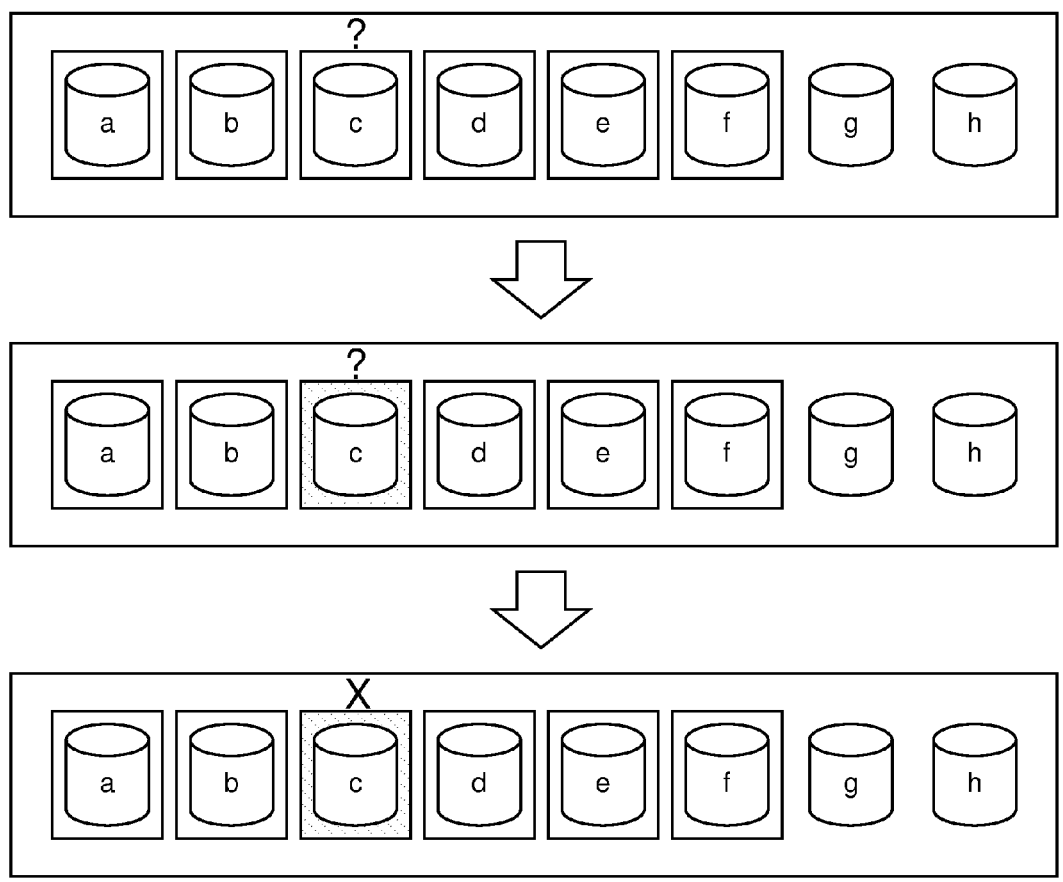
FIGS. 2 to 4 are schematic diagram of the processing of RAID arrays.
Figure 3:
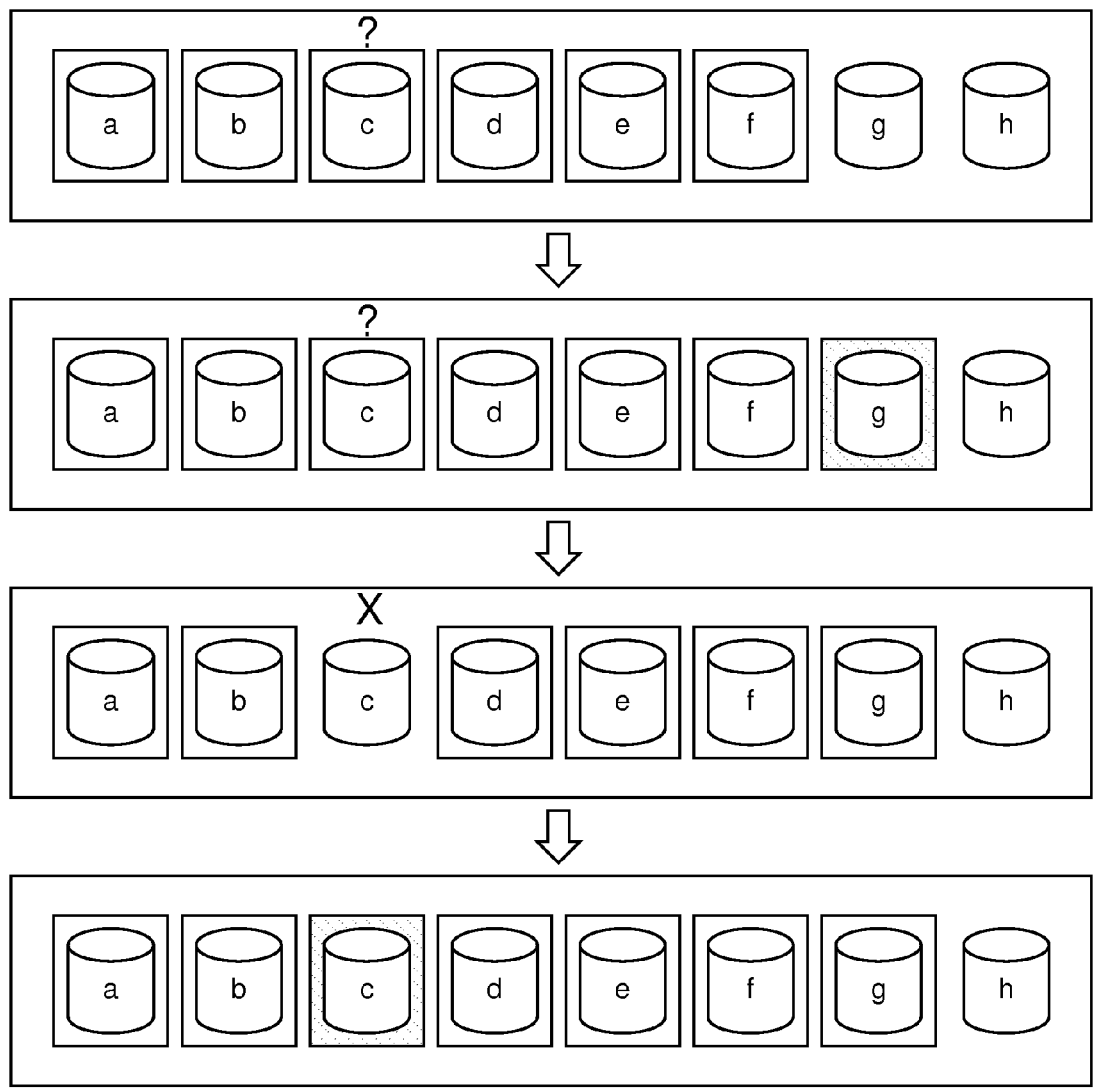
Figure 4:
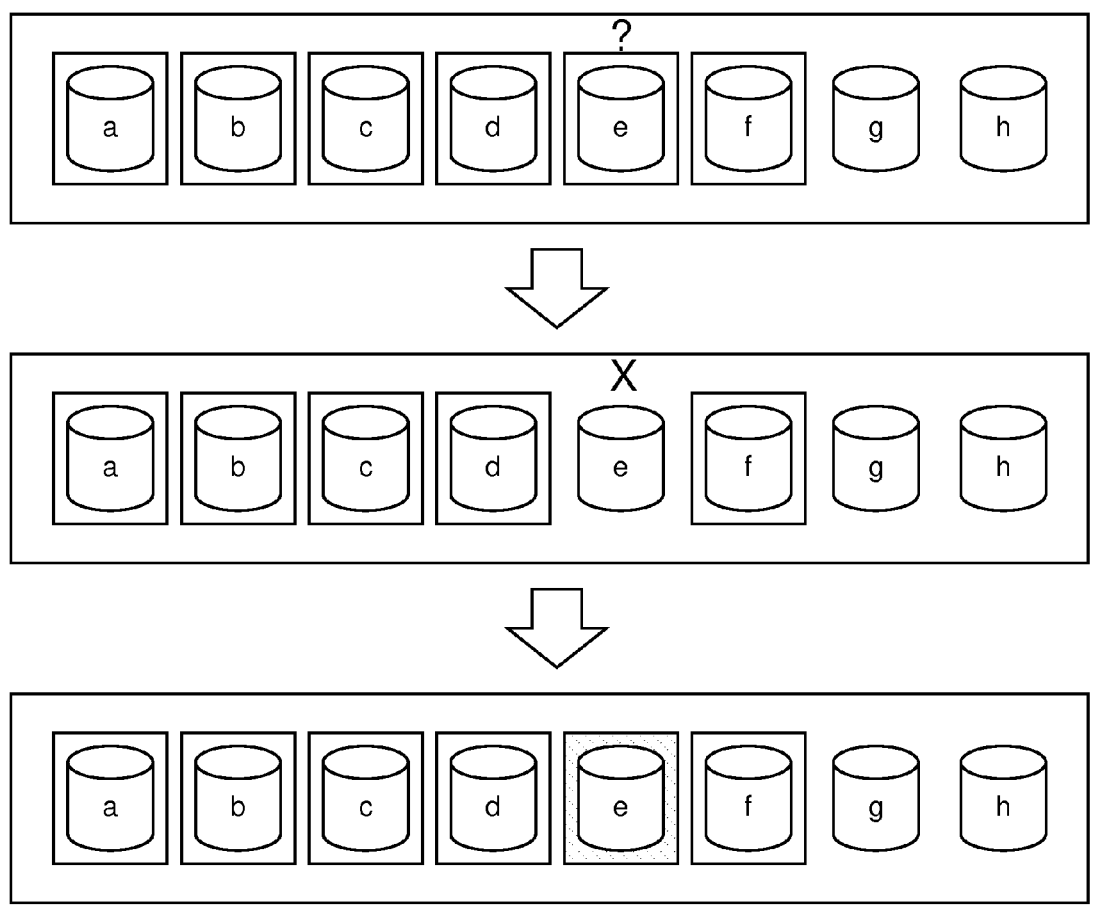

The drive error recovery process management to maintain or restore array configuration is illustrated in FIGS. 2, 3 and 4. FIG. 2 illustrates the situation in which a short-term drive performance degrading ERP is needed. From the healthy system shown in FIG. 1, drive "c" reports (or it is observed by a management component) that the drive requires an ERP that will degrade its performance for a short duration. This is shown in the top row of FIG. 2, where the drive "c" is marked with a "?", which indicates that a performance degrading drive ERP is needed for this drive.

The resource controller 10 processes the ERP request and decides to deploy RAID "component in doubt" for this member drive. The RAID array waits for IO to wind down, and then starts component in doubt on the drive "c" array member, as shown in the second row of FIG. 2, where the stippling around the drive "c" indicates a member drive with component in doubt operating. Once the RAID component in doubt is in operation, then the drive ERP is started, as shown in the bottom row of FIG. 2, where the drive c is marked with an "X", which indicates a drive ERP is in progress that causes drive performance degradation. The drive ERP completes, the RAID component in doubt recovery is completed and then the RAID array resumes in the healthy state, as per FIG. 1.

FIG. 3 illustrates the handling of a long-term drive offline ERP being needed. From the healthy system of FIG. 1, drive "c" reports (or it is observed) that the drive requires an ERP that will take the drive offline for a long duration. This is shown in the top row of FIG. 3, where the drive "c" is marked with a "?", which indicates that a long-term drive offline ERP is needed for this drive. The resource controller 10 processes this request and decides to deploy concurrent exchange away from drive "c", copying the data onto spare drive "g", as shown in the second row of FIG. 3, where drive g, which was a spare, has now been added into the array. The stippling around drive g indicates that this drive is the target of a concurrent exchange.

Once the RAID concurrent exchange has been completed, drive "g" is now the array member and the drive ERP is able to be started on drive "c" (which is now a spare), as shown in the third row of FIG. 3, where the drive "c" is marked with an "X", which indicates a drive ERP is in progress that has taken the drive offline. Drive "c" at this time is not part of the RAID array. The drive ERP completes, the drive "c" can now be exchanged back from drive "g", as shown in the bottom row of FIG. 3. The contents of drive "g" are copied back onto drive "c". The stippling around drive "c" indicates that this drive is the target of a concurrent exchange. Once the exchange completes, the original healthy system state of FIG. 1 is restored.

FIG. 4 illustrates the handling of an immediate short term drive data loss ERP. From the healthy system in FIG. 1, drive "e" reports (or it is observed) that the drive requires an ERP that will require the drive to lose all of its data as soon as possible (i.e., there is no time to do a concurrent exchange)

but the drive will be available for IO after a short period. For example, the ERP could involve a drive reformat but the drive can process IO during this reformat or the reformat is very quick. This is shown in the top row of FIG. 4, where the drive "e" is marked with a "?", which indicates that a data loss drive ERP is needed for this drive.

The resource controller 10 processes this request, and decides to process the ERP without taking a spare drive in the expectation that drive "e" will recover quickly. For the duration of the ERP, the array becomes degraded and the drive becomes spare. The RAID array IO is wound down and the ERP started on drive "e", as shown in the middle row of FIG. 4. Once the drive ERP completes, the drive "e" can now be added back into the RAID array, and rebuilt as shown in the bottom row of FIG. 4, where the stippling around drive "e" indicates that the drive is being rebuilt. Once the rebuild completes, the original healthy system state of FIG. 1 is restored.

From the above three example, it will be seen that the detection that an ERP is needed for a resource element 14 in the resource system results in the resource controller 10 taking one or more actions in relation to the resource elements 14 prior to performing the detected ERP. These actions are based on the prior categorization of the ERP. Following completion of the detected ERP on the specific resource element 14, the resource controller 10 may deploy one or more additional actions in relation to the resource elements, according to the categorization of the detected ERP.

Figure 5:
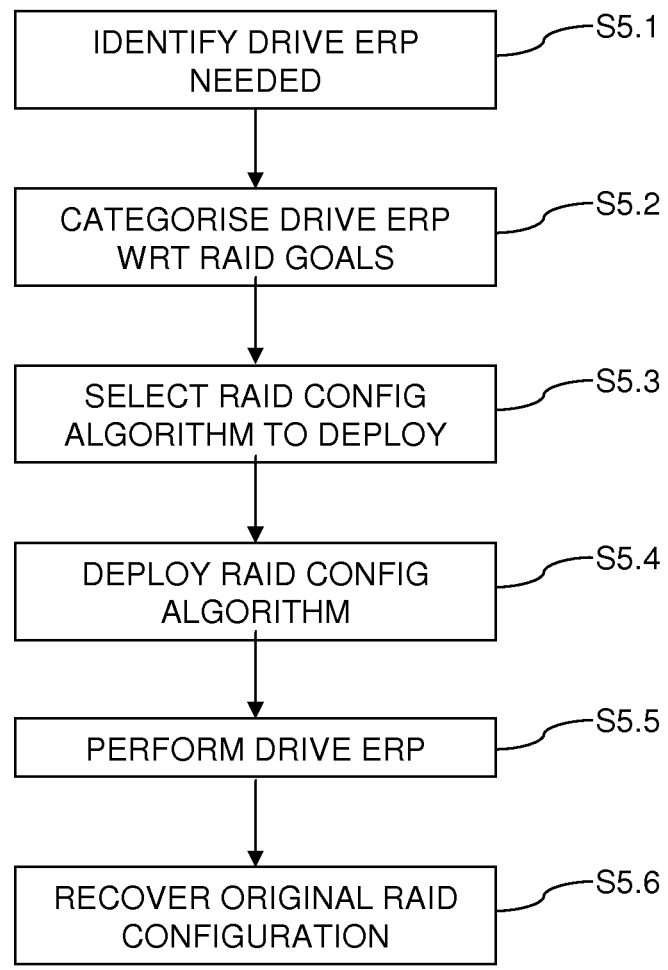
FIG. 5 is a flowchart of a method of operating a RAID array.

The overall process flow is summarised in FIG. 5, in relation to a RAID and drive specific implementation of the improved system. At step S5.1, the need for a drive ERP is identified. At step S5.2, categorization of drive ERP consequences on the RAID operational goals is carried out. Such factors as drive performance degradation, whether a drive will be offline, whether data will be lost from a drive and the drive ERP duration are taken into account, in the categorization process. At step S5.3, there is selected a RAID configuration algorithm to deploy during the drive ERP that will satisfy the RAID operational goals. At step S5.4, the RAID configuration algorithm is deployed and at step S5.5 the drive ERP is performed. Finally, at step S5.6, the original RAID configuration is recovered.

Figure 6:
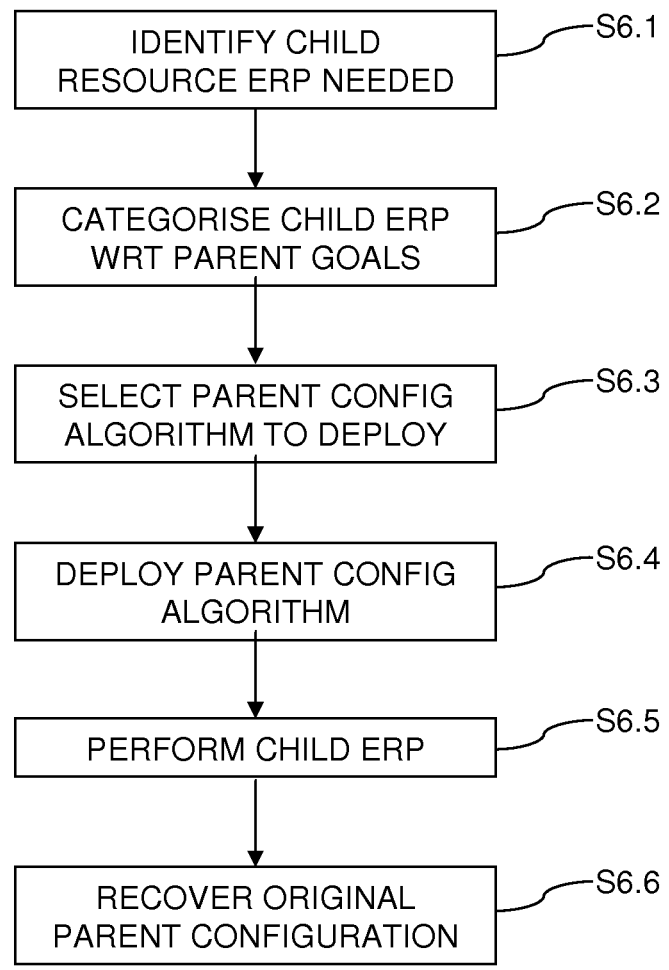
FIG. 6 is a flowchart of a method of operating a resource system.

A generic overall process flow for generic storage in terms of parent and child resources is summarised in FIG. 6. At step S6.1, the need for a child resource ERP is identified. At step S6.2, categorization of child resource ERP consequences on the parent resource operational goals is carried out. Such factors as child resource performance degradation, whether a child resource will be offline, whether data will be lost from a child resource and the child resource ERP duration are taken into account, in the categorization process. At step S6.3, there is selected a parent configuration algorithm to deploy during the child resource ERP that will satisfy the parent operational goals. At step S6.4, the parent configuration algorithm is deployed and at step S6.5 the child resource ERP is performed. Finally, at step S6.6, the original parent configuration is recovered.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for operating a disk drive array, the disk drive array including a plurality of disk drives including one or more spare disk drives, and a resource controller connected to the disk drives and operating the disk drives according to a predefined set of disk drive array operational goals, the method comprising the steps of:
    categorizing each of a set of disk drive error recovery maintenance procedures based on the consequences of executing the error recovery maintenance procedure on one or more of a predefined set of disk drive array operational goals, wherein the disk drive array operational goals includes a data integrity goal, a data redundancy goal, and a data reliability goal, wherein the data integrity goal is used to determine if the disk drive is the last path to data, in response to determining that the disk drive is the last path to the data then the error recovery maintenance procedures will then not occur, wherein the data redundancy goal is used to determine if a spare disk drive is available for the disk drive then the error recovery maintenance procedures will then occur if the spare disk drive is available, and wherein the data reliability goal is used to allow the error recovery maintenance process to be performed one time on the disk drive;
    detecting an error condition on a specific disk drive of the disk drive array and identifying one of the set of error recovery maintenance procedures that is required to be performed on the specific disk drive;
    based on the category of the identified required error recovery maintenance procedure, reconfiguring the disk drive array, by taking the specific drive offline, copying the data on the specific drive to the one or more spare drives, and putting the one or more spare drives online, to maintain the disk drive array operational goals while the identified error recovery procedure is performed; and
    performing the identified required error recovery maintenance procedure on the specific disk drive.

2. A method according to claim 1, further comprising:
    following completion of the identified required error recovery maintenance procedure on the specific disk drive, if the disk drive array was reconfigured, reconfiguring the disk drive array back to a configuration prior to performing the identified required error recovery maintenance procedure on the specific disk drive by taking the one or more spare drives offline, copying the data on one or more spare drives back to the specific drive, and putting the specific drive online.

3. A disk drive array comprising a plurality of disk drives including one or more spare disk drives and a resource controller connected to the disk drives and operating the disk drives according to a predefined set of disk drive array operational goals, wherein the resource controller is arranged to:
    categorize each of a set of disk drive error recovery maintenance procedures based on the consequences of executing the error recovery maintenance procedure on one or more of a predefined set of disk drive array operational goals, wherein the disk drive array operational goals includes a data integrity goal, a data redundancy goal, and a data reliability goal, wherein the data integrity goal is used to determine if the disk drive is the last path to data, in response to determining that the disk drive is the last path to the data then the error recovery maintenance procedures will then not occur, wherein the data redundancy goal is used to determine if a spare disk drive is available for the disk drive then the error recovery maintenance procedures will then occur if the spare disk drive is available, and wherein the data reliability goal is used to allow the error recovery maintenance process to be performed one time on the disk drive;
    detect an error condition on a specific disk drive of the disk drive array and identifying one of the set of error recovery maintenance procedures that is required to be performed on the specific disk drive;
    based on the category of the identified required error recovery maintenance procedure, reconfiguring the disk drive array, by taking the specific drive offline, copying the data on the specific drive to the one or more spare drives, and putting the one or more spare drives online, to maintain the disk drive array operational goals while the identified error recovery procedure is performed; and
    perform the identified required error recovery maintenance procedure on the specific disk drive.

4. A system according to claim 3, wherein the resource controller is further arranged, following completion of the identified required error recovery maintenance procedure on the specific disk drive, if the disk drive array was reconfigured, to reconfigure the disk drive array back to a configuration prior to performing the identified required error recovery maintenance procedure on the specific disk drive by taking the one or more spare drives offline, copying the data on one or more spare drives back to the specific drive, and putting the specific drive online.

5. A non-transitory computer-readable storage medium that includes a computer program product for operating a disk drive array comprising a plurality of disk drives including one or more spare disk drives, and a resource controller connected to the disk drives and operating the disk drives according to a predefined set of disk drive array operational goals, the computer program product comprising instructions for:

categorizing each of a set of disk drive error recovery maintenance procedures based on the consequences of executing the error recovery maintenance procedure on one or more of a predefined set of disk drive array operational goals, wherein the disk drive array operational goals includes a data integrity goal, a data redundancy goal, and a data reliability goal, wherein the data integrity goal is used to determine if the disk drive is the last path to data, in response to determining that the disk drive is the last path to the data then the error recovery maintenance procedures will then not occur, wherein the data redundancy goal is used to determine if a spare disk drive is available for the disk drive then the error recovery maintenance procedures will then occur if the spare disk drive is available, and wherein the data reliability goal is used to allow the error recovery maintenance process to be performed one time on the disk drive;

detecting an error condition on a specific disk drive of the disk drive array and identifying one of the set of error recovery maintenance procedures that is required to be performed on the specific disk drive;

based on the category of the identified required error recovery maintenance procedure, reconfiguring the disk drive array, by taking the specific drive offline, copying the data on the specific drive to the one or more spare drives, and putting the one or more spare drives online, to maintain the disk drive array operational goals while the identified error recovery procedure is performed; and performing the identified required error recovery maintenance procedure on the specific disk drive.

6. The non-transitory computer-readable storage medium that includes the computer program product according to claim 5, further comprising instructions for, following completion of the identified required error recovery maintenance procedure on the specific disk drive, if the disk drive array was reconfigured, reconfiguring the disk drive array back to a configuration prior to performing the identified required error recovery maintenance procedure on the specific disk drive by taking the one or more spare drives offline, copying the data on one or more spare drives back to the specific drive, and putting the specific drive online.

* * * * *